United States Patent
Hekstra-Nowacka et al.

(10) Patent No.: US 8,230,289 B2
(45) Date of Patent: Jul. 24, 2012

(54) DATA PROCESSOR SYSTEM AND A METHOD FOR COMMUNICATION DATA

(75) Inventors: Ewa Hekstra-Nowacka, Waalre (NL); Andrei Radulescu, Eindhoven (NL); David R. Evoy, Chandler, AZ (US)

(73) Assignee: ST-Ericsson SA, Geneva (CH)

( * ) Notice: Subject to any disclaimer, the term of this patent is extended or adjusted under 35 U.S.C. 154(b) by 764 days.

(21) Appl. No.: 12/161,674

(22) PCT Filed: Nov. 14, 2006

(86) PCT No.: PCT/IB2006/054240
§ 371 (c)(1),
(2), (4) Date: Mar. 13, 2009

(87) PCT Pub. No.: WO2007/060574
PCT Pub. Date: May 31, 2007

(65) Prior Publication Data
US 2009/0222705 A1 Sep. 3, 2009

(30) Foreign Application Priority Data
Nov. 23, 2005 (EP) ..................................... 05111126

(51) Int. Cl.
G08C 25/02 (2006.01)
H04L 1/18 (2006.01)
(52) U.S. Cl. ........................................ 714/748; 714/749
(58) Field of Classification Search .................. 714/748, 714/749
See application file for complete search history.

(56) References Cited

U.S. PATENT DOCUMENTS

| | | | |
|---|---|---|---|
| 3,988,545 A | 10/1976 | Kuemmerle et al. | |
| 7,032,153 B1 * | 4/2006 | Zhang et al. | 714/749 |
| 7,631,239 B2 * | 12/2009 | Yeo et al. | 714/748 |
| 2004/0255219 A1 | 12/2004 | Grossman et al. | |

FOREIGN PATENT DOCUMENTS

| WO | WO00/16511 A | 3/2000 |
|---|---|---|
| WO | WO2005/064840 A | 7/2005 |

OTHER PUBLICATIONS

International Search Report dated Oct. 4, 2007 in connection with PCT Application No. PCT/IB2006/054240.
Written Opinion of the International Searching Authority dated May 23, 2008 in connection with PCT Application No. PCT/IB2006/054240.

* cited by examiner

Primary Examiner — Sam Rizk

(57) ABSTRACT

A data processor system includes a first data processor unit for transmitting data units to a second data processor unit and a retry buffer for temporarily storing transmitted data units. The second data processor unit receives the transmitted data and includes an error detector for detecting an error in the received data. When an error is detected, the first data processor unit is notified and a controller causes a data selector to select data from a retry buffer. The first data processor unit limits retransmission of a data unit to a predetermined maximum number of times irrespective of whether the data unit is correctly received or not. This allows for an undisturbed flow of streaming data with an increased reliability.

20 Claims, 12 Drawing Sheets

FIG. 13

Figure 1:
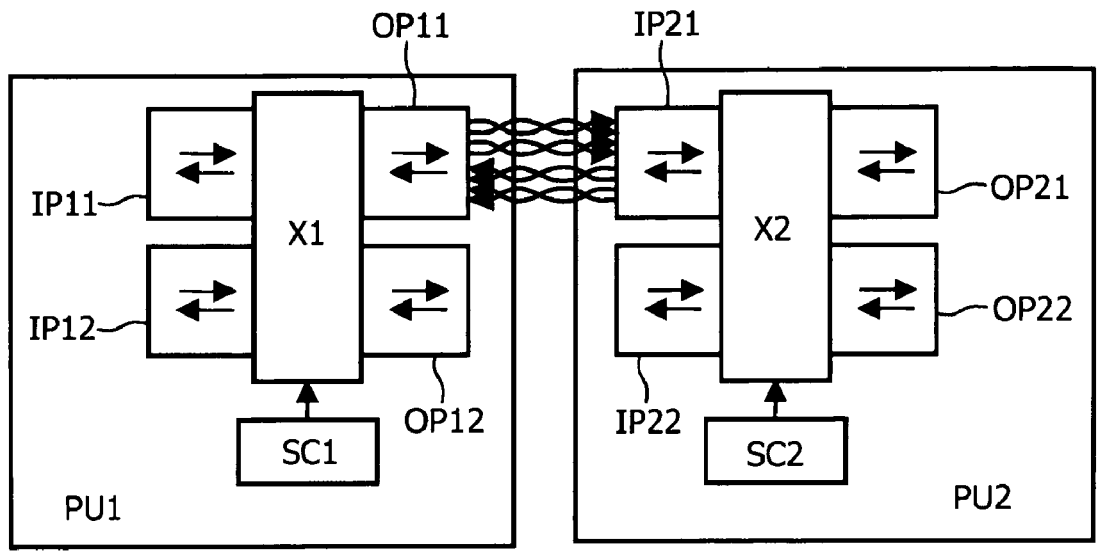

| Time | SWITCH 1 Shed. | SWITCH 1 Isoc retry buffer | | | Link | Isoc input buffer | | | SWITCH 2 | | Sched. |
|---|---|---|---|---|---|---|---|---|---|---|---|
| 1 | Ab | | | | Ab | | | Ab | Aa | Dc | Db |
| 2 | Ac | Ac | Ab | Aa | Ac | | | Ac | Ab | Aa | Dc |
| 3 | Ad | Ad | Ac | Aa | Ad | Ad | | Ad | Ab | Aa | |
| 4 | Ae | Ae | Ad | Ab | Ae | Ae | Ad | Ae | Ac | Ab | |
| 5 | Af | Af | Ae | Ac | Af | Af | Ae | Af | Ad | Ac | Aa |
| 6 | Ba | Ba | Af | Ad | Ba | Ba | Af | Ba | Ae | Ad | Ab |
| 7 | Bb | Bb | Ba | Ae | Bb | Bb | Ba | Bb | Af | Ae | Ac |
| 8 | Ca | Ca | Bb | Af | Ca | Ca | Bb | Ca | Ba | Af | Ad |
| 9 | | | Ca | Ba | | | Ca | | Bb | Ba | Ae |
| 10 | Da | | | Bb | Da | | | Da | Ca | Bb | Af |
| 11 | Db | Db | Da | Ca | Db | | | Db | Da | Ca | Ba |
| 12 | Dc | Dc | Db | Da | Dc | | | Dc | Db | Da | Bb |
| 13 | | | Dc | Da | | | | | Dc | Da | Ca |
| 14 | | | | Db | | | | | | Da | |
| 15 | | | | Dc | | | | | | Da | |
| 16 | Aa | Aa | | | Aa | | | Aa | Ab | Db | Da |
| 17 | Ab | Ab | Aa | | Ab | | | Ab | Ac | Dc | Db |
| 18 | Ac | Ac | Ab | Aa | Ac | | | Ac | Ad | Aa | Dc |
| 19 | Ad | Ad | Ac | Aa | Ad | Ad | | Ad | Ab | Aa | |
| 20 | Ae | Ae | Ad | Ab | Ae | Ae | Ad | Ae | Ac | Ab | |
| 21 | Af | Af | Ae | Ac | Af | Af | Ae | Af | Ad | Ac | Aa |
| 22 | Ba | Ba | Af | Ad | Ba | Ba | Af | Ba | Ae | Ad | Ab |
| 23 | Bb | Bb | Ba | Ae | Bb | Bb | Ba | Bb | Af | Ae | Ac |
| 24 | Ca | Ca | Bb | Af | Ca | Ca | Bb | Ca | Ba | Af | Ad |
| 26 | | | Ca | Ba | | | Ca | | Bb | Ba | Ae |
| 27 | | | | Bb | | | | | Ca | Ba | Af |

FIG. 14

| Time | SWITCH 1 ||| Link | SWITCH 2 |||| |
|---|---|---|---|---|---|---|---|---|---|
| | Sched. | Isoc retry buffer || | Isoc input buffer |||| Sched. |
| 1 | Ab | | | | | | | | Db |
| 2 | Ac | Ab | | | | | | | Dc |
| 3 | Ad | Ac | Ab | | | | | | |
| 4 | Ae | Ad | Ac | Aa | | | | Ab | Aa |
| 5 | Af | Ae | Ad | Ab | | | Ae | Ac | Ab |
| 6 | Ba | Af | Ae | Ac | | Ae | Af | Ad | Ac |
| 7 | Bb | Ba | Af | Ad | * | Af | Ba | Ae | Ad |
| 8 | Ca | Bb | Ba | Ae | | Ba | Bb | Af | Ae |
| 9 | | Ca | Bb | Af | | Bb | Ca | Ba | Af |
| 10 | | | Ca | Ba | | Ca | | Bb | Ba |
| 11 | Da | | | Bb | | | | Ca | Bb |
| 12 | Db | Db | | Ca | | | | | Ca |
| 13 | Dc | Db | Dc | Da | | | | Dc | |
| 14 | | Dc | Db | Db | | | Dc | Da | |
| 15 | | | Dc | Dc | | Dc | Da | Db | Da |
| 16 | Aa | | | Aa | | Da | Db | Dc | Db |
| 17 | Ab | Aa | | Ab | | Db | Dc | Aa | Dc |
| 18 | Ac | Ab | Aa | Ac | | Ad | Aa | Ab | Aa |
| 19 | Ad | Ac | Ab | Ad | | Ad | Ab | Ac | Ab |
| 20 | Ae | Ad | Ac | Ae | | Ae | Ac | Ad | Ac |
| 21 | Af | Ae | Ad | Af | | Af | Ad | Ae | Ad |
| 22 | Ba | Af | Ae | Ba | | Ba | Ae | Af | Ae |
| 23 | Bb | Ba | Af | Bb | | Bb | Af | Ba | Af |
| 24 | Ca | Bb | Ba | Ca | | Ca | Ba | Bb | |
| 26 | | Ca | Bb | | | | Bb | Ca | |
| 27 | | | Ca | | | | Ca | | |

FIG. 17

FIG. 18

| Time | SWITCH 1 | | | Link | | SWITCH 2 | | | | Sched. |
|---|---|---|---|---|---|---|---|---|---|---|
| | Shed. | Isoc retry buffer | | | | Isoc input buffer | | | | |
| 1 | Ab | Ab | Aa | | | | | | Ab | Db |
| 2 | Ac | Ac | Ab | Ac | | | | Ab | Ac | Dc |
| 3 | Ad | Ad | Ac | Ad | | | | Ac | Aa | |
| 4 | Ae | Ae | Ad | Ae | | | Ad | Ac | Aa | Aa |
| 5 | Af | Af | Ae | Af | | | Ae | Ad | Ab | Ab |
| 6 | Ba | Ba | Af | Ba | * | Ba | Af | Ae | Ac | Ac |
| 7 | Bb | Bb | Ba | Bb | | Bb | Ba | Af | Ad | Ad |
| 8 | Ca | Ca | Bb | Ca | | Ca | Bb | Ba | Ae | Ae |
| 9 | | | Ca | | TO | | Ca | Bb | Af | Af |
| 10 | | | | | | | | | | |
| 11 | Da | | Da | Ca | | | | | Ca | |
| 12 | Db | Db | Da | Da | | | | | Da | Ca |
| 13 | Dc | Db | Da | Db | | | | Dc | Da | |
| 14 | | Dc | Db | Dc | | | | Dc | Da | |
| 15 | | | Dc | | | | | | Db | |
| 16 | Aa | | Aa | Aa | | Dc | Aa | Db | Dc | Da |
| 17 | Ab | Ab | Aa | Ab | | | Aa | Db | Aa | Db |
| 18 | Ac | Ac | Ab | Ac | | | Ab | Aa | Aa | Dc |
| 19 | Ad | Ad | Ac | Ad | | | Ac | Ab | Ab | |
| 20 | Ae | Ae | Ad | Ae | | | Ad | Ac | Ac | |
| 21 | Af | Af | Ae | Af | | | Ae | Ad | Ad | Aa |
| 22 | Ba | Ba | Af | Ba | | Ae | Af | Ae | Ae | Ab |
| 23 | Bb | Bb | Ba | Bb | | Af | Ba | Af | Af | Ac |
| 24 | Ca | Ca | Bb | Ca | | Ba | Bb | Ba | Ba | Ad |
| 26 | | | Ca | | | Bb | Ca | Bb | Bb | Ae |
| 27 | | | | | | Ca | | Ca | Ca | Af |

DATA PROCESSOR SYSTEM AND A METHOD FOR COMMUNICATION DATA

CROSS-REFERENCE TO RELATED APPLICATION(S)

The present application claims priority under 35 U.S.C. §365 to International Patent Application No. PCT/IB2006/054240 filed Nov. 14, 2006, entitled "A DATA PROCESSOR SYSTEM AND A METHOD FOR COMMUNICATING DATA". International Patent Application No. PCT/IB2006/054240 claims priority under 35 U.S.C. §365 and/or 35U.S.C. §119(a) to European Patent Application No. 05111126.8 filed Nov. 23, 2005 and which are incorporated herein by reference into the present disclosure as if fully set forth herein.

Nowadays data processor systems are available having a plurality of data processor units, e.g. general-purpose processors, application specific processors and memories. The data processor units exchange data via communication links. In addition a clock signal is exchanged for synchronization of the data transmission at bit/byte level. The clock signal may be embedded in the data signal, or provided separately. In large systems it may not always be feasible to transmit data directly from a source to a destination. Instead the data may be transmitted stepwise via links between subsequent processor units. A connection for providing a communication between the source and the destination may provide various levels of quality of service depending on the type of data to be communicated. An example thereof is a guaranteed throughput quality of service, according to which the data is transmitted within a predetermined time interval. Isochronous data requires a guaranteed throughput quality of service. In the case of a best effort quality of service no guarantees are given for the delivery time. A further aspect of quality of service is the reliability with which the data is transmitted. In addition to user data, i.e. the data that is to be transmitted for a particular application running on the data processor system, so called control data may be transmitted for controlling the transmission of the user data. Control data may be transmitted to indicate an error, for link resynchronization etc.

A time slot is understood to be a predetermined window in time, starting at predetermined time instances, usually according to a periodic schedule. The start of these time instances may be subject to a certain tolerance, in order to allow for insertion of relatively short control messages e.g. containing control data as described above. All, or a part of the available time-slots may be reserved for data having a guaranteed throughput requirement. A data unit is defined in the present application as a predetermined amount of data scheduled for transmission in a time slot. A data unit may comprise a plurality of data packets, comprising a header and a payload. Alternatively a packet may be distributed over a plurality of data units.

In practice the occurrence of errors in the exchange of data cannot be excluded, so that the bit error rate has a value differing from 0, e.g. $10^{-12}$. Although this is a very low value, any error could lead to serious malfunction. For example an error on a clock signal would render the received speech inaudible or the received video garbled. The reliability can be improved by adding an error correction code to the transmitted data. However, this involves an increased overhead in the data transmission process and it does not always guarantee the integrity of data (the error correcting code may for example be not strong enough to correct all errors that occurred). It is also known that the reliability of data transmission can be realized by applying a simple error detection method at each processor unit where the data is received and to request a retransmission if an error is detected. However, this way of realizing the reliability may cause a delay in the transmission depending on the number of data slots affected by errors and their occurrences.

According to the invention, it is a purpose to provide a data processor system having a data exchange that is significantly more robust (against the link errors) while having a predictable delay and a limited overhead.

It is a further purpose of the invention to provide a method for communicating data having this advantage.

According to the invention a data processor system is provided according to claim 1, and a method according to claim 7.

In the data processor system according to the present invention the reliability of the data transmission is improved according to the following principles.

The second data processor unit, functioning as a receiver, performs an error detection method, for example a CRC check to the received data to determine whether the received data is error free. If erroneous data is detected it provides a feedback to the first processor unit, functioning as transmitter, including an identification of the erroneous slot, for example by an identification number. In response thereto the transmitter retransmits the requested data. At the beginning of the retransmission the transmitter may perform a resynchronization of the link from the first to the second data processor unit, also denoted as forward link. The link used by the second data processor unit for reporting errors to the first data processor unit is also denoted as backward link. The second processor unit may use the backward link to transmit other data to the first processor unit. Likewise the first processor unit may use the forward link to report errors detected in this other data.

In the device and method according to the invention retransmission of a data unit belonging to a guaranteed throughput traffic class is limited to a predetermined maximum number of times irrespective of whether the data unit is correctly received or not. In addition the second data processor unit forwards the received data unit at a point in time, which is a predetermined time interval later than the point in time of the first transmission of the data unit. The predetermined time interval is at least long enough to allow for the predetermined maximum number of retransmissions.

The data units are kept in the retry buffer only for a limited time, which relates to the allowed number of retransmissions. In case of bad link conditions and therefore large accumulation of errors, which may affect the retransmitted data as well, this could lead to data losses as data is removed from the retry buffer after a prescribed time. So in other words, a throughput is guaranteed, but in case of severe problems the reliable delivery of data is sacrificed in order to allow for a timely delivery of the data units that follows the erroneous data units. Data units not belonging to a guaranteed traffic class such as best effort data may be retransmitted an arbitrary number of times or may not be retransmitted at all depending on the requirements for reliability of their transmission.

The data processor system may comprise an arbitrary number of data processor units. The topology in which the data processor units are arranged need not necessarily be chain like, but may alternatively be a network, in which each data processor unit in the system can receive data from a plurality of neighboring data processor units and can transmit data to a plurality of receiving data processor units.

The data processor system according to the invention may provide for different traffic classes, e.g. one for first data requiring an guaranteed throughput quality of service, and one for second data which is to be transmitted on a best effort basis. In such a data processor system preferably only the first data is retransmitted. Anyhow, the second data is only transmitted and/or retransmitted during time intervals wherein no transmission or retransmission of first data is scheduled. In this way the delay of the first data can be modest. In case the protocol for transmission between two subsequent data processing units does not offer a sufficient level of reliability, a higher-level protocol may still provide for a retransmission of second-class data, provided that it does not interfere with transmission schedule for the first class traffic.

In an embodiment the first data processor unit may have a source for generating its own data, e.g. a sensor, such as a microphone or a camera, or a random number generator or a generator generating data according to a particular function. In a particular embodiment the first data processor unit is a switch or router, and the data source comprises a plurality of input ports, the scheduler selecting data for transmission from one of the input ports according to a schedule. In this way a network can be constructed from an arbitrary number of data processor units.

In addition the switch or router of the first data processor unit may comprise a plurality of output ports.

In an embodiment of the data processor system the first data processor unit during a retransmission of a data unit provides a tag indicative for the time slot in which the data unit was originally transmitted. This allows the second data processor unit to resynchronize itself to the incoming data stream.

In an embodiment of the data processor system according to the invention, the link between the first and the second data processor unit is resynchronized before retransmission. An error in a received data unit may be the result of a desynchronization of the data processor units, e.g. due to an error in the clock signal. Such desynchronization may also affect data units following the data unit for which an error was reported. A resynchronization therefore reduces the risks for subsequent errors.

Until resynchronization the data units received after the first data unit for which an error was reported are also unreliable. According to an embodiment of the invention, also those isochronous data units are retransmitted which were already transmitted in the period between the first transmission of the data unit for which an error was detected and its retransmission. Each of which is preceded by a tag indicative for the time slot in which the data unit was originally transmitted.

In a further embodiment the second data processor unit comprises a time-out module, which provides a time-out signal if the data unit for which an error was reported is not retransmitted in time by the first data processor unit. The second data processor unit initiates a resynchronization of a link used for reporting the error. If the first data processor unit does not respond to the error message, the backward link, used by the second data processor unit to report the error message is probably not functioning properly. This is often resolved by a resynchronization.

The method according to the present invention is preferably characterized in that control data is transmitted at the boundary of a first and a second time slot, the second time slot commencing as soon as the transmission of the control data is completed. The slight delay incurred by the transmission of the user data in this case can be compensated by a synchronization step as described for example in the earlier filed patent application EP05101717.6 (PH050209). In this way the delay incurred by the user data is substantially less than would be the case if the transmission of the user data in the second time-slot were skipped, and were postponed to a succeeding third time-slot.

Alternatively control data may be transmitted at other temporal locations within the time-slot as, e.g. at the boundary between two subsequent packets or even between two subsequent words of a packet. This has the advantage of a shorter delay of the control message, allowing for a smaller retry buffer.

Figure 2:
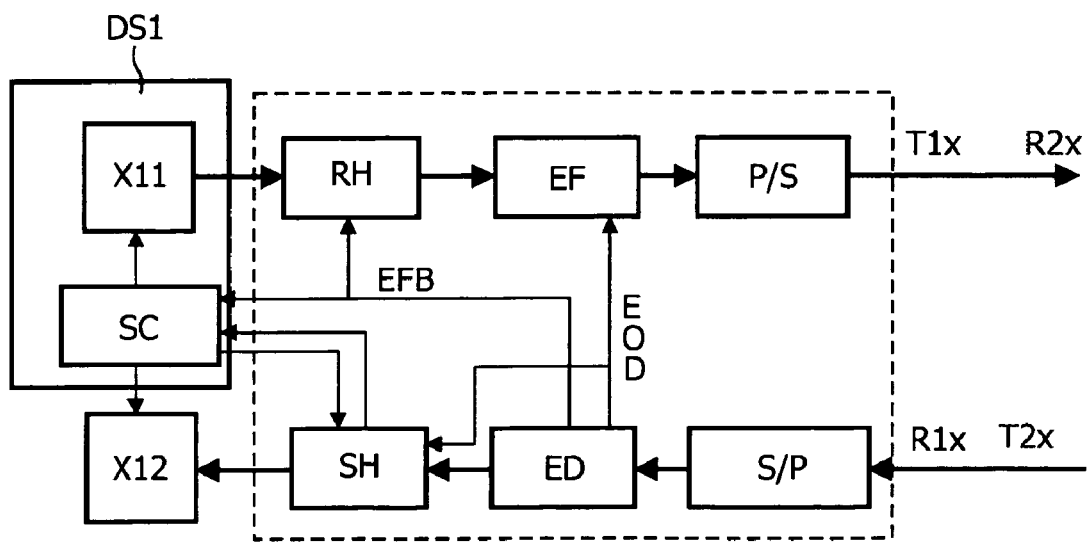
Figure 3:
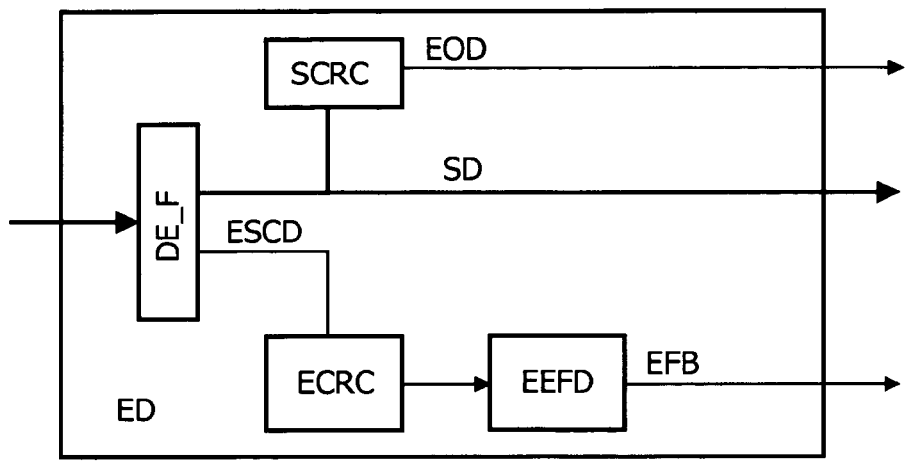
Figure 4:
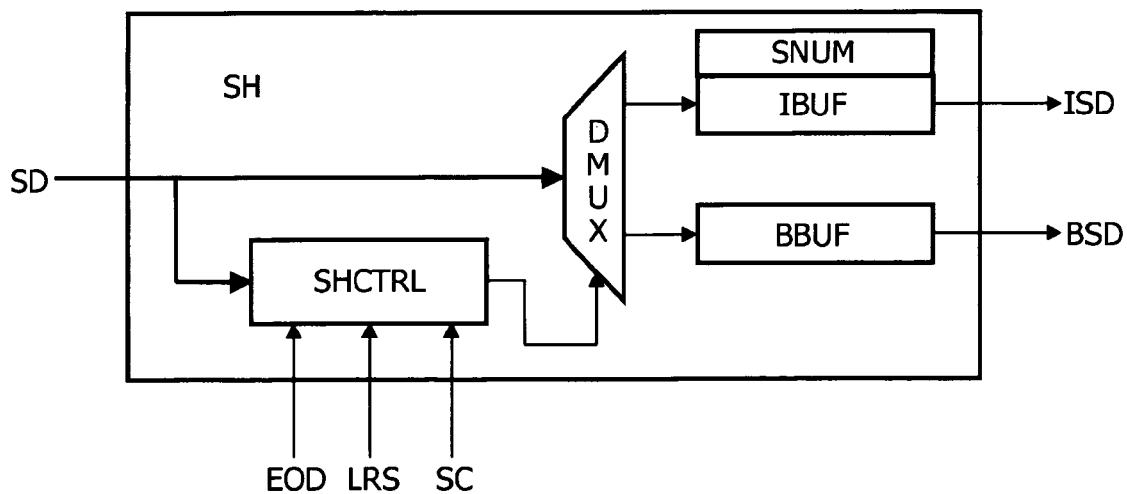
Figure 5:
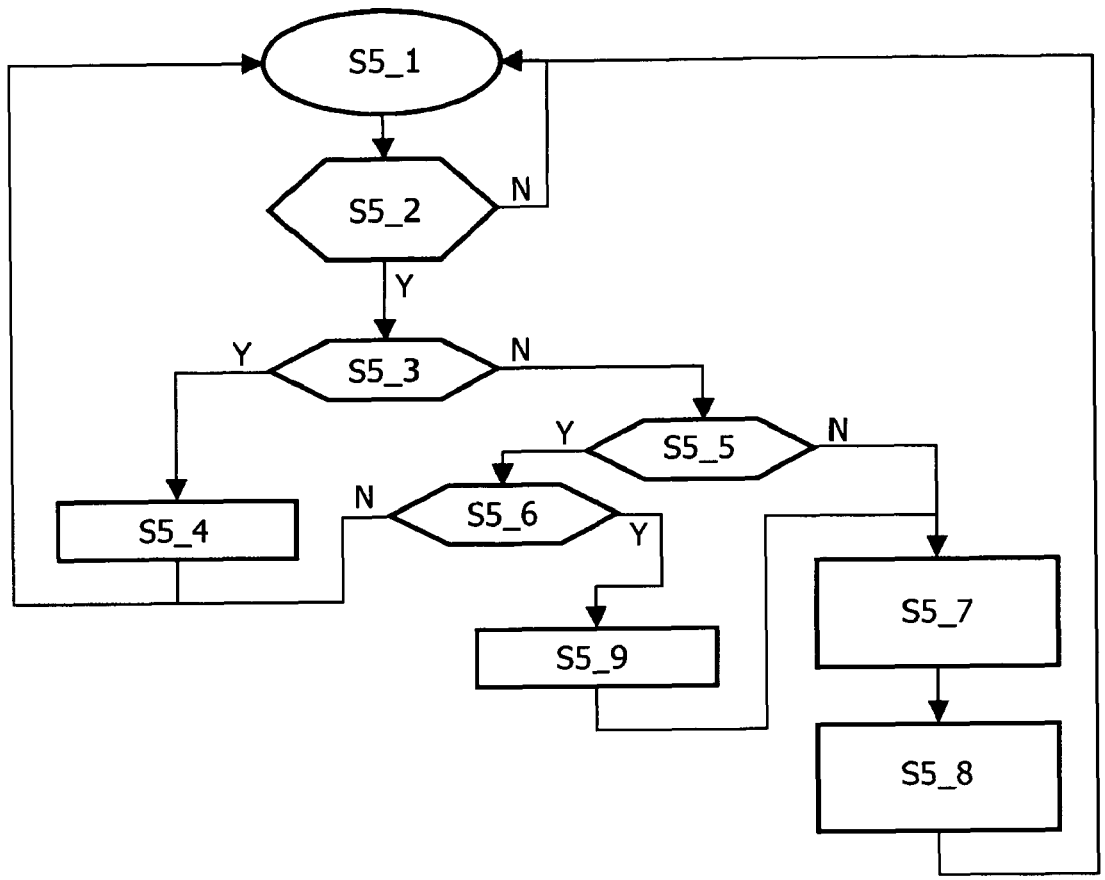
Figure 6:
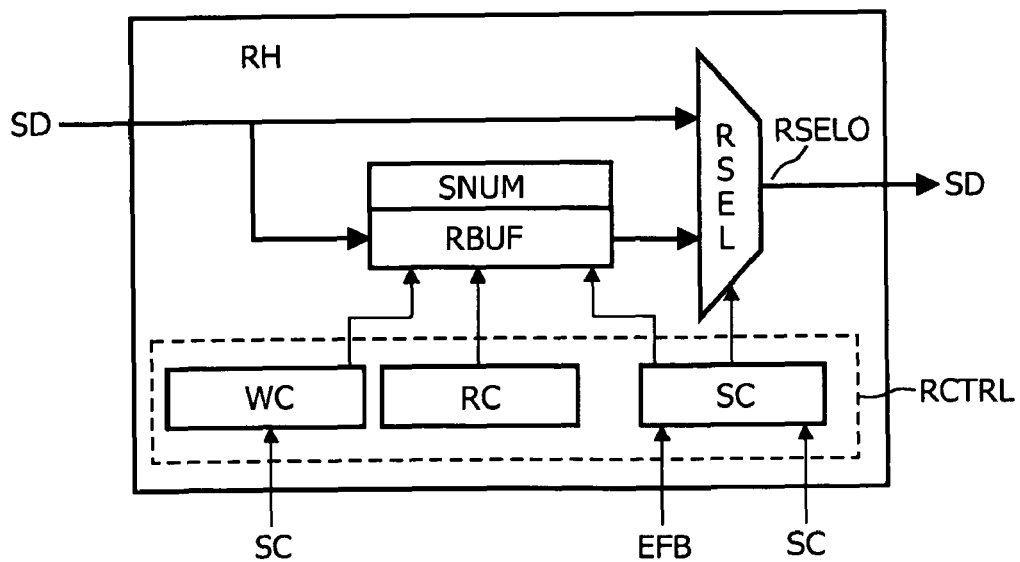
Figure 7:
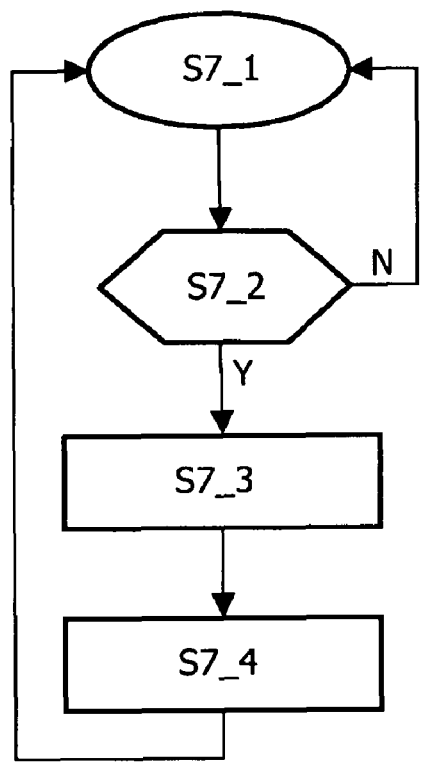
Figure 8:
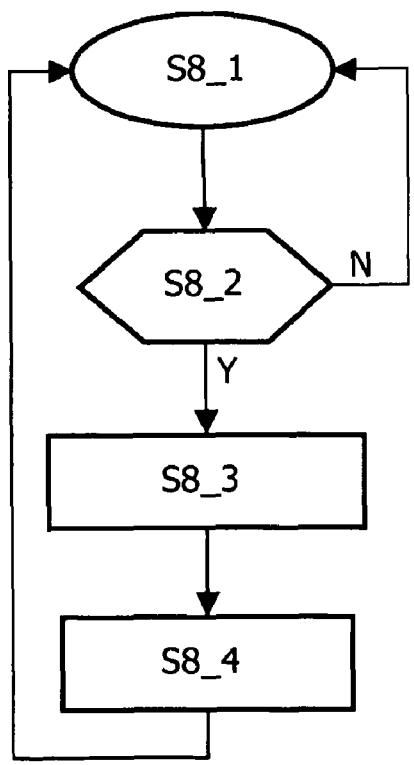
Figure 9:
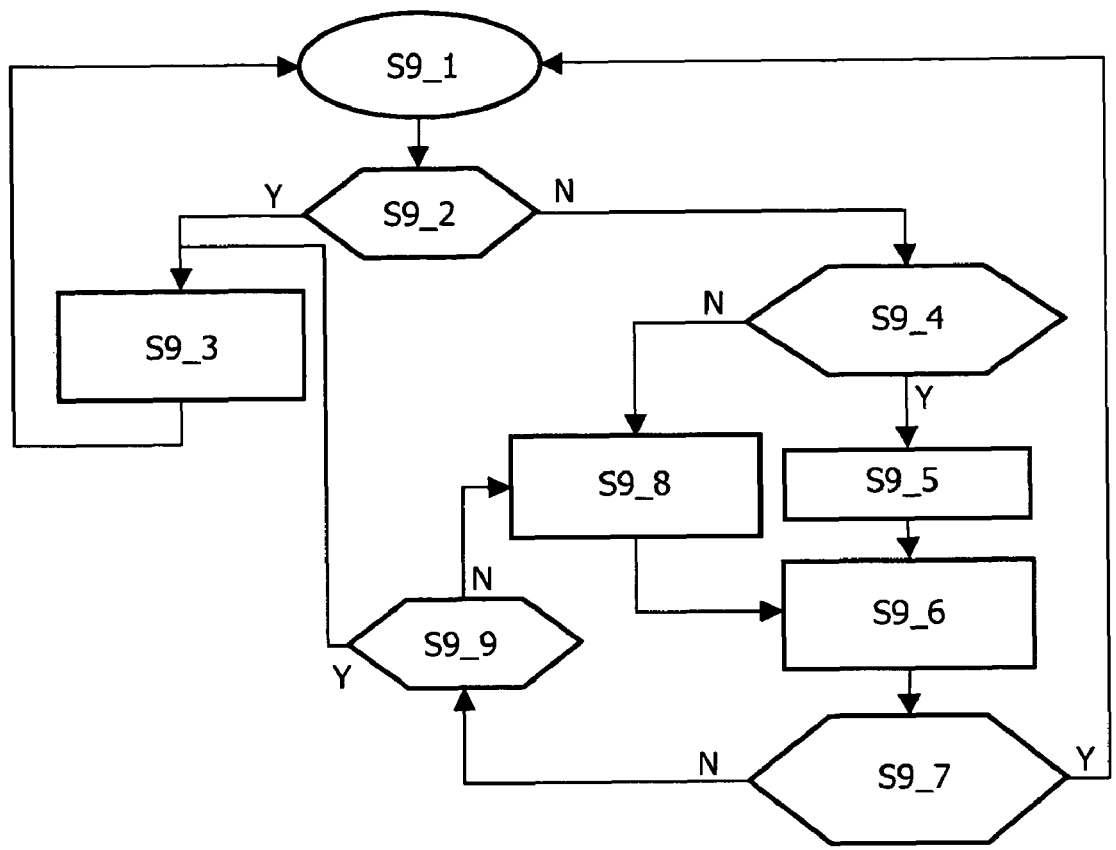
Figure 10:
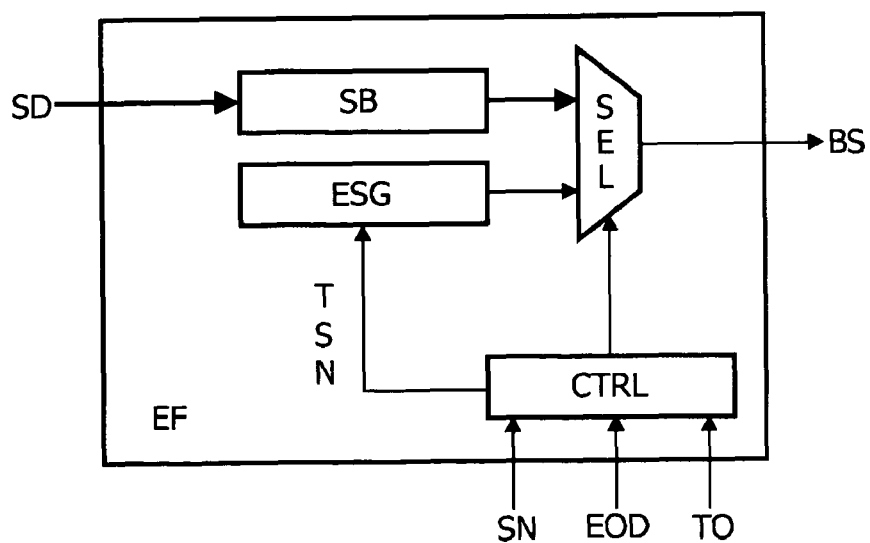
Figure 11:
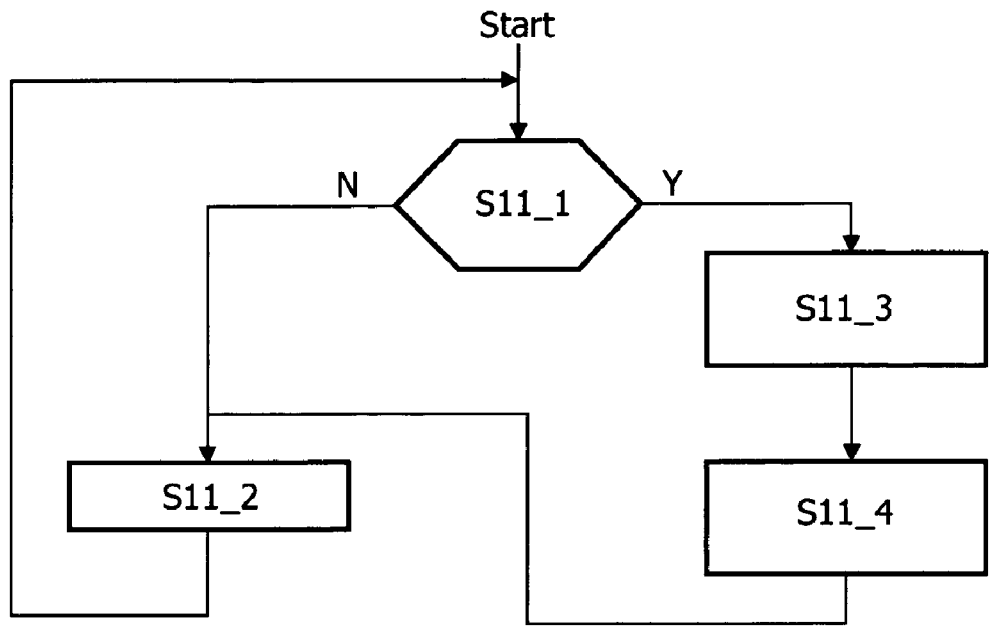
Figure 12:
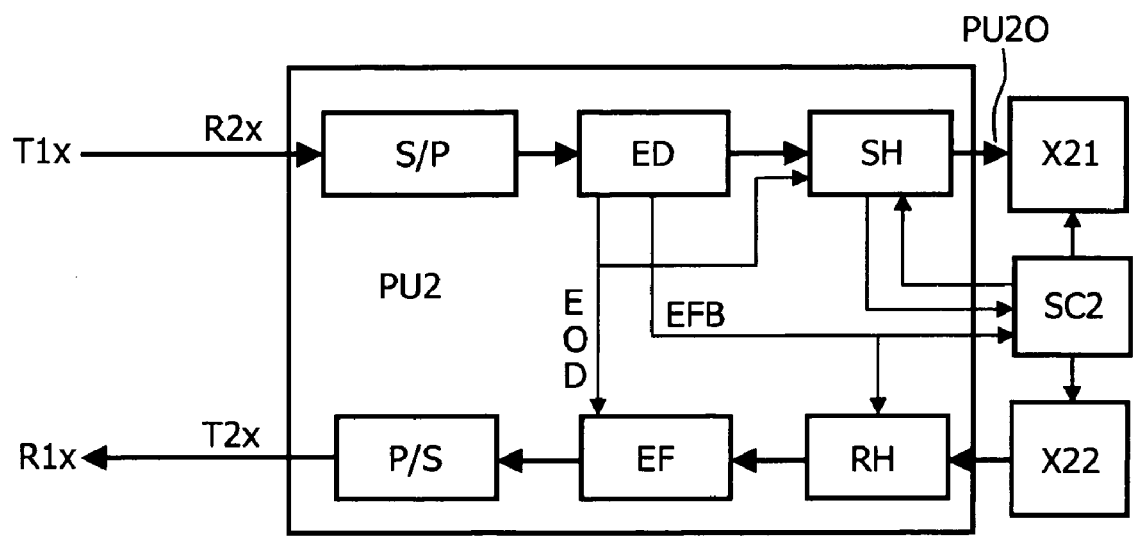
Figure 15:
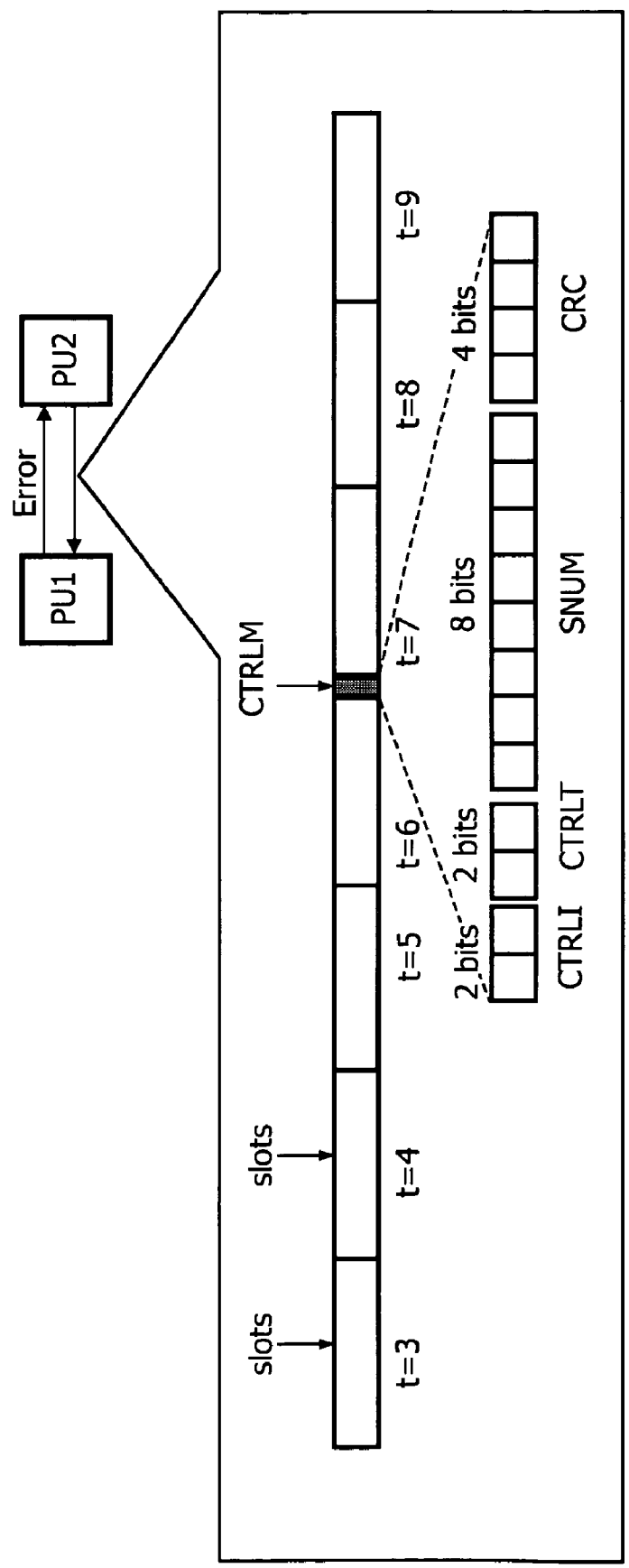
Figure 16:
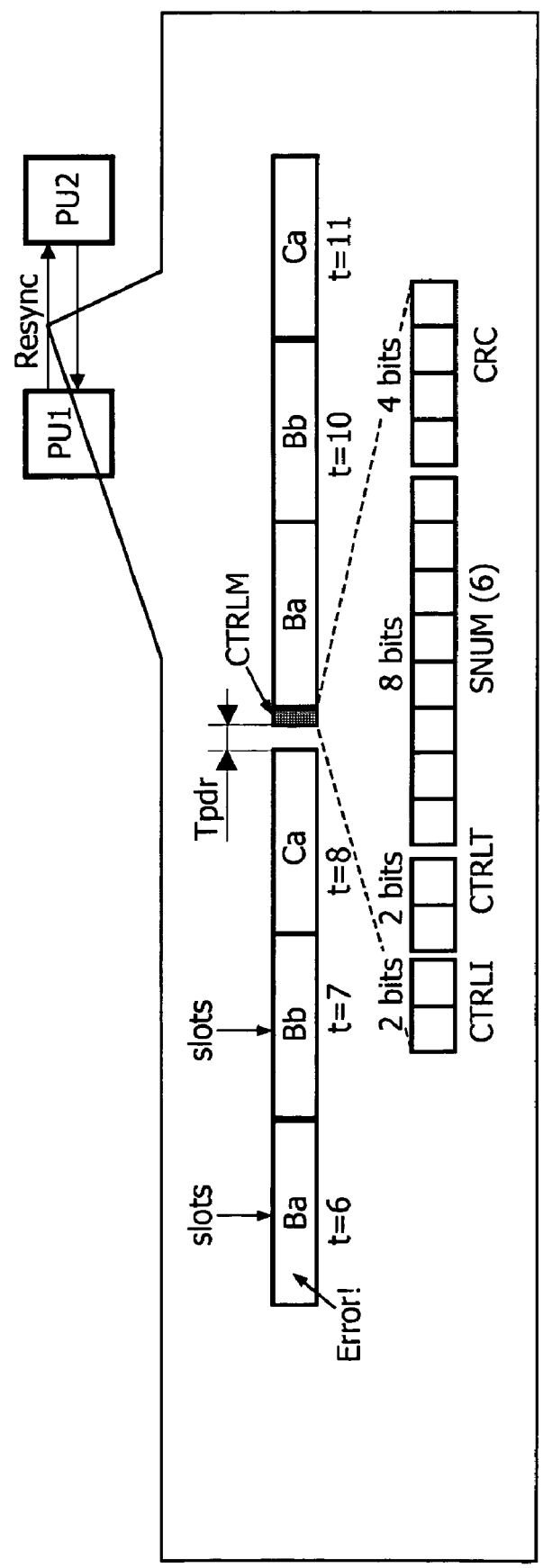

These and other aspects are described in more detail with reference to the drawing. Therein FIG. 1 schematically shows a data processor system comprising a first data processor unit PU1 and a second data processor unit PU2, FIG. 2 shows the first data processor unit in more detail, FIG. 3 shows an embodiment of a first module used in the first processor unit, FIG. 4 shows an embodiment of a second module used in the first processor unit, FIG. 5 shows a method of operation of the second module, FIG. 6 shows a third module of the first processor unit, FIG. 7 shows a method of operation of a first part of the third module, FIG. 8 shows a method of operation of a second part of the third module, FIG. 9 shows the method of operation of a third part of the third module, FIG. 10 shows a fourth module of the first processor unit, FIG. 11 shows a method of operation of the fourth module, FIG. 12 shows an embodiment of the second processor unit, FIG. 13 shows a first example of a data transmission between the first and the second processor unit, FIG. 14 shows a second example of a data transmission between the first and the second processor unit, FIG. 15 shows in more detail the transmission of an error message by the second processor unit to the first processor unit, FIG. 16 shows in more detail the retransmission of a data unit from the first processor unit to the second processor unit FIG. 17 shows a third example of a data transmission between the first and the second processor unit, FIG. 18 shows a fourth example of a data transmission between the first and the second processor unit, FIG. 1 schematically shows a data processor system comprising a first data processor unit PU1 and a second data processor unit PU2. The first data processor unit has a plurality of input ports IP11, IP12, output ports OP11, OP12 and a switch X1 controlled by a scheduler SC1 for selectively forwarding data from the input ports to the output ports. Likewise the second data processor unit has input ports IP21, IP22, output ports OP21, OP22 and a switch X2 controlled by scheduler SC2.

FIG. 2 shows the first data processor unit in more detail. The first data processor unit PU1 has an output TIx for providing a stream of data to a forward link with the second data processor unit PU2. The first data processor unit PU1 further has an input R1x for receiving a stream of data from a backward link with the second data processor unit PU2.

The first data processor unit has a data source DS1 for providing data units for transmission to the second data processor unit PU2. In this case a first part SW11 of the switch SW1 functions as a data source. It selects data from the plurality of input ports IP11, IP12. The scheduler SC21 selects data from one of the input ports IP1, IP2 according to a schedule. An example of such a switch is described in earlier filed patent application EP05101524.6 (PH050189)

The first data processor unit PU1 further comprises a deserializer S/P for serial to parallel conversion of incoming data via the backward link T2x-R1x. In another embodiment however, the data may be transmitted in parallel form. In that case a deserializer is superfluous. The deserializer provides its output data to an error detector ED for detecting errors in incoming data. The error detector is coupled to a slot handler SH, which directs slots to the appropriate queues and drops slots, which are affected by an error.

The data processor unit comprises a retry handler RH for transmitting or retransmitting data units. During normal operation (no errors) it is transparent. In that case it forwards the data provided by the data source DS1 for transmission via the forward link. In case an error was reported by the second data processor unit PU2 it provides the data for retransmission. An error feedback unit EF is included for providing feedback to the second data processor unit PU2 about erroneously received data. To that end it receives an error on data signal EOD from the error detector. A serializer P/S converts parallel data into serial data for transmission. The serializer is superfluous if a parallel data channel is used as the forward link.

In the processor system according to the present invention, the error detector has a dual function:

It detects errors in the received data units. To that end it performs a redundancy check.

It provides error information consisting of an error signal EOD as well as the slot number SN on which the error occurred.

This error information is provided to the scheduler SC1 and retry handler RH, resulting in a request to the transmitter of the erroneous data, to retry the transmission.

In addition it passes information to the slot handler SH so that it can block a further transmission of the erroneous data.

The Error detector unit ED further recognizes a control sequence generated by the second processor unit PU2 when the latter has detected an error in the data transmitted by the first processor unit PU1.

The error detecting unit ED is shown in more detail in FIG. 3. It comprises a deformatter DE_F having a data input for receiving a stream of data from the deserializer. It separates control data ESCD (also denoted here as escape ESC data) and user data SD.

In an embodiment the control data has the following format:

A notification for indicating the type of the ESC sequence.

A slot number for identifying the slot to which the ESC sequence relates, and

A cyclic redundancy check code CRC enabling an error correction of the ESC sequence In the present embodiment the notification includes a first bit to discriminate a "panic" from a "normal" situation, and additional bits to indicate various panic and normal situations. Examples of escape data of the type panic are ESC error, ESC sync, ESC pause. Normal ESC data may for example include flow control information. It will be understood that this is merely an example of a way in which control messages can be implemented, and that the skilled person can conceive various alternative implementations.

The separated user data SD is provided at a first output and the control data ESCD at a second output of the deformatter DE_F. The first output is coupled to the slot handler and to an error detector SCRC that performs a CRC check on the user data. If it detects an error in the user data, a control signal EOD (error on data) is generated, which is provided to the error feedback block EF (FIG. 10) and to the slot handler SH. The error on data signal EOD may be a 1-bit signal, which indicates whether at least one error occurred in the data unit concerned. Alternatively the error on data signal EOD may be a more detailed error message. On the basis of this information (and its history) the slot handler may decide to drop user data if this data has an error or if this data is without errors but follows an erroneous slot for which the retransmission has not yet started.

As an error in control data can cause serious malfunction, the recognized control data is processed by a cyclic redundancy check module ECRC, which performs a cyclic redundancy check (CRC) on control data. To that end the control data has a relatively high number of redundancy bits, e.g. 4 bits in comparison to the total number of bits e.g. 16 in the control data. The amount of control data transmitted is relatively small in comparison to the amount of slot data. This implies that the control data can be transmitted with a high level of accuracy, while causing a low overhead in the total amount of transmitted data. The decoded output data from the error detector ECRC is provided to an error feedback detector EEFD, which recognizes control messages indicating an error, and which provides an error feedback message to the scheduler. The error feedback detector EEFD separately provides an error signal and a slot number indicating the slot in which the error occurred as output. This information enables the retry handler RH and the scheduler SC1 to select the proper data for retransmission.

The slot handler SH directs slots to appropriate queues, e.g. queues for isochronous data and best effort data. In addition other queues may be present for other data classes. It further drops slots with (and affected by) an error.

The architecture of the slot handler SH is shown in more detail in FIG. 4. The slot handler comprises an input buffer IBUF. The input buffer IBUF is coupled to the input R1x via the deserializer S/P and the error detector unit ED and serves for temporarily storing the received data. In the embodiment shown in FIG. 4, the slot handler SH comprises separate input buffers IBUF, BBUF for isochronous data and best effort data. A demultiplexing unit DMUX selectively provides isochronous data and best effort data to a first buffer IBUF or a second buffer BBUF respectively. The first buffer IBUF stores for each isochronous data unit it's corresponding slot number SNUM as well.

A slot handling control unit SHCTRL controls the demultiplexing unit DMUX. The slot handling control unit SHCTRL receives input signals EOD, a link resynchronization signal LRS, and a schedule signal SC. Using these signals, the slot handling control unit SHCTRL determines to which buffer IBUF, BBUF the incoming data will be written and causes to drop data slots with an error, and data slots following an error until resynchronization/retry.

FIG. 5 shows the operation of the slot handler SH.

In step S5_1 the slot handler SH waits for a slot boundary. At the time of a slot boundary it is verified in step S5_2 whether an isochronous data unit is scheduled for said time slot. If this is not the case, control flow returns to step S5_1. In case an isochronous packet does start the EOD signal is verified in step S5_3 to determine whether the data unit received in the time slot is free of errors. If the EOD signal indicates an error, a retry flag is set on in step S5_4 and control flow returns to step S5_1. If the EOD signal indicates no error, it is verified in step S5_5 whether the current status of the retry flag is set. If this is not the case control flow is passed to step S5_7. There an isochronous packet is written into the input buffer IBUF for isochronous data. In addition, in step S5_8, the slot number SNUM corresponding to said isochronous data unit is written into said input buffer IBUF, and subsequently control flow returns to step S5_1. If it is determined in step S5_5 that the retry flag is set, it is subsequently verified in step S5_6 whether the link is resynchronized. If the link is not resynchronized control flow is passed immediately to step S5_1. If the link is resynchronized the retry flag is switched off in step S5_9, and subsequently the steps S5_7 and S5_8 are performed, after which control is returned to step S5_1.

FIG. 6 shows in more detail the retry handler RH. The retry handler either transparently forwards user data which it received from the switch X, or retransmits earlier transmitted user data if an error occurred during said earlier transmission. As shown in FIG. 6 the retry handler comprises an input for receiving slot data SD provided by the switch X or other data source, and a retry buffer RBUF for temporarily storing isochronous data, as well as the corresponding slot numbers SNUM. Isochronous data units are maintained in the retry buffer RBUF after their first transmission for a predetermined duration, The slot number serves as a tag, which facilitates finding the proper isochronous slot data in the buffer. It also determines when the isochronous data should be forwarded.

A data selector RSEL is provided for either transmitting the slot data received at the input port, or the data temporarily stored in the retry buffer RBUF. The output RSELO of the data selector RSEL forms the output of the retry handler RH, which is coupled to the output of the first data processor unit PU1 via the error feedback module EF and the serializer P/S.

The data selector RSEL and the retry buffer RBUF are controlled by a controller.

The controller RCTRL has a write control module WC, a remove control module RC and a send control SC module for respectively controlling writing, removing, and sending of packets from the retry buffer RBUF.

If the receiving data processor unit PU2 has detected an error in an earlier transmitted isochronous data packet it returns control data indicating this. The receipt of this control data enables a retransmission of that packet from the retry buffer RBUF. To that end the send control block SC provides the appropriate slot number SNUM to the retry buffer RBUF, and enables the selector RSEL to pass the corresponding data unit to its output. In the present embodiment, only isochronous data packets are retransmitted. However, a higher level control layer may be present which verifies whether the transmitted data was in fact received by the end-point and may initiate a retransmission, which if so desired is repeated until all data is properly received.

In order to facilitate recognition of the retransmitted data, each retransmitted isochronous packet is preceded by a sequence with an indication for the slot number. During retransmission newly arriving data units are stored in the retry buffer RBUF according to schedule. In an alternative embodiment not only the data unit is retransmitted for which an error was reported, but also all data units that were already transmitted when said error report was received. In that embodiment only the first retransmitted data unit in a sequence need to be preceded by a tag or slot number.

The operation of the write control block WC is illustrated in more detail with reference to the flow chart shown in FIG. 7

In step S7_1, the control block WC waits until the slot boundary. In step S7_2 the write control blocks verifies if an isochronous data unit starts at the slot boundary. If this is not the case the control flow returns to step S7_1. If an isochronous data unit starts that data unit is stored in the retry buffer in step S7_3, as well as its slot number in step S7_4. After step S7_4 control flow returns to step S7_1.

FIG. 8 shows in more detail the operation of the remove control block RC:

In step S8_1 the procedure waits until the start of a slot boundary, and then passes control to step S8_2.

In step S8_2 it is verified whether an isochronous data unit remains in the retry buffer RBUF longer than a predetermined time-interval. By way of example it is presumed that the predetermined time-interval has a duration of 3 slots. If the retry buffer does not contain any isochronous data units, control flow returns immediately to step S8_1. If an isochronous data unit is present in the retry buffer for a duration longer than the predetermined time-interval the data unit is removed from the retry buffer in step S8_3, and its slot number is removed in step S8_4. After step S8_4 control flow returns to step S8_1.

FIG. 9 shows in more detail the operation of the send control block SC.

In step S9_1 the send control block SC waits for an error on data signal EOD from the error detector ED. If an error is reported it verifies in step S9_2 whether the retry buffer RBUF is empty. If the retry buffer RBUF indeed is empty it continues with step S9_3, in which a resynchronization operation, also denoted as a reset of the link, takes place, and the current slot number is sent. In this way clock errors are prevented.

If the retry buffer is not empty it is verified in step S9_4 whether the data unit corresponding to the slot for which an error was reported, also denoted as e-slot, is present in the retry buffer RBUF. If this is the case a resynchronization operation is started in step S9_5 and in the subsequent step S9_6 the isochronous data unit corresponding to the e-slot is sent, preceded by its slot number. Then in step S9_7 it is verified whether the slot number of said data unit corresponds to the current slot number. If that is the case, control flow returns to step S9_1. If that is not the case it is verified in step S9_9 whether the retry buffer is empty. If the retry buffer is not empty it retrieves the next available isochronous data unit from the retry buffer in step. S9_8. Step 9_8 is also executed if it is detected in step S9_4 that the data unit corresponding to e-slot is not present in the retry-buffer. If it is determined in step S9_9 that the retry buffer RBUF is empty, control flow passes via step S9_3, described before, to step S9_1.

The second data processor unit further has an error feedback unit. This unit functions as a message-generating unit coupled to the error detector for generating an error message for the first data processor unit in case the error detector detects an error.

The Error feedback unit EF is shown in more detail in FIG. 10. This unit inserts control data into the stream of user data. Preferably the control data is inserted at slot boundaries. Alternatively the control data may be inserted at packet boundaries, both of best effort and guaranteed throughput packets, or at word (e.g. byte) boundaries. In this way control messages may be transmitted with a shorter delay, at the cost of a more complex detection means for the control messages. Alternatively the data link may be asymmetric, i.e. there is data transmission on the forward direction, and no data transmission on the return direction. In that case only the control data is sent on the return direction and there are no restrictions when the control data should be sent, as there is no other data the return link is shared with. The return link may be kept in a low power state, until the control data must be transmitted. In that case the transmission of control data involves an additional time for powering up of the link. As shown in FIG. 10, the error feedback unit comprises a slot buffer SB for temporarily storing slot data to be sent in the time slot. The slot buffer SB has an input coupled to the retry handler RH.

Control data to be inserted in the data stream is generated by control data generator ESG. In the present embodiment a selection module SEL is coupled to the slot buffer SB that selects either slot data provided by the slot buffer SB or control data provided by the control data generator ESG. The selection module SEL is controlled by a control module CTRL that further controls the control data generator in response to the Error on data signal EOD or Timeout TO.

A time-out signal TO is generated if an expected response does not take place within a prescribed time interval). To that end a timer is triggered if within a specified period of time after a specific event a specific reaction associated with the event is expected. For example when an error is detected in a data unit it is expected that said data unit is retransmitted within 3 time-slots after issuing the error feedback to the data transmitter. If this does not happen, a timeout is issued. For example the reason that the timeout occurs can be that the error feedback message has suffered from an error and has not been recognized by the transmitter. In that case transmission on the link continues as if nothing has happened. If a time out is detected the return link is resynchronized and feedback is sent again. If the retransmission begins before the timer expires no additional feedback is necessary. The timer for generating the time out signal may be a part of the controller CTRL.

If the controller receives an Error on data signal EOD, it provides the slot number SN of the erroneous slot to the control data generator. In case a time out is detected it provides the slot number of the error message associated with the timeout to the control signal generator.

FIG. 11 schematically shows the control flow for the control module CTRL of the error feed back unit EF.

In step S11_1 the control module CTRL determines whether an error was detected in the data received in a particular time slot, or if a time-out condition was detected, i.e. the retransmitted data was not received within a predetermined time period.

If neither one of these conditions is detected the data in the retry buffer RBUF, available for transmission is sent to the next processor unit in step S11_2. In case either one of these conditions is detected an ESC sequence is generated in step S11_3 and send in step S11_4. If step S11_4 is completed the control module CTRL proceeds with step S11_2. After step S11_2 is completed the procedure is repeated with step S11_1.

FIG. 12 shows in more detail the second data processor unit PU2. In the embodiment shown the second data processor unit PU2 is identical to the first data processor unit PU1. The second data processor unit PU2 has an input R2x for receiving the transmitted data from output T1x of the first data processor unit PU1. It further has an output PU2O. From the output PU2O the received data is further transmitted, in this case via a switch X21, to a third data processor unit (not shown).

In the embodiment shown the data processor units PU1, PU2 are full fledged, i.e. capable of transmitting data to each other and capable of giving error feedback messages to each other. In another embodiment the data processor units PU1, PU2 may be arranged as a data transmitter and a data receiver respectively. In that case only the second data processor unit PU2 need to be capable to generate and transmit an error message, while only the first data processor unit PU1 is capable of detecting an error message from the data processor arrangement PU2.

In such an embodiment of the data processor system according to the invention the first data processor unit PU1 has a data source for providing data units for transmission to the second data processor unit PU2. It further has a retry buffer for temporarily storing transmitted data units, and a data selector for selecting data units from the data source or from the retry buffer, as well as a controller for controlling the data selector. The retry buffer, the data selector and the controller may be integrated in a retry handler, for example, as described with reference to FIG. 6. An output for providing data selected for transmission may be formed by the output RSELO of the data selector RSEL. As the first data processor unit PU1 does not need to receive user data, a slot handler SH is superfluous in that case.

The second data processor unit PU2 has an input R2x for receiving the transmitted data from the first data processor unit PU1 and an output for further transmitting the received data to a third data processor unit, an input buffer coupled to the input, for temporarily storing the received data, an error detector for detecting an error in the received data, and a message generating unit coupled to the error detector for generating an error message for the first data processor unit in case the error detector detects an error. In that case the output of the error detector ED may serve as the output of the second data processor unit PU2. The second data processor unit PU2 does not need to have a retry handler RH, as it does not itself transmit data to the first data processor unit PU1.

As in the previous embodiment the controller of the first data processor unit PU1 causes the data selector RSEL to select data from the retry buffer RBUF if it receives an error message, and causes the data selector RSEL to select the data source otherwise. The first data processor unit PU1 limits retransmission of a data unit to a predetermined maximum number of times irrespective of whether the data unit is correctly received or not. The present invention is further clarified by some examples of a data transmission between a first and a second processor unit. In these examples it is assumed that two communicating processor units, e.g. switches, in the data processor system have the same but cyclically rotated isochronous schedule, obtained by a forwarding delay in the processor units arranged in the communication chain. In this case the forwarding delay is assumed to involve 5 time slots. This number comprises 3 slots of retry delay, 1 slot switch delay and 1 slot for frame synchronization. This number is based on the following assumptions:

A single retry suffices for recovering from an error in isochronous data.

The data link is resynchronized before retry.

Each retried isochronous packet is preceded by a resynchronization control sequence Each switch has a fixed isochronous schedule Although in this case it is assumed that only a single retry is allowed it will be clear to the skilled person that the number of retries may be greater than 1, provided that it is bound to a predetermined maximum. Of course the retry buffer of the data processor unit serving as a transmitter should be large enough. I.e. it should be capable of maintaining data units available until the transmission thereof has been retried for said predetermined maximum of times, while still accepting new data. Also the input buffer of the data processor unit serving as the receiver should be large enough to delay the incoming data for a time interval corresponding to the maximum number of retries. In that case the data stream further transmitted by the second data processor unit PU2 is not influenced by the errors occurring in the data stream from the first to the second data processor unit, unless the same data unit is erroneously received by the second data processor unit PU2 even at the last retransmission. In that case, the first data processing unit PU1 continues transmitting the data units following the erroneously transmitted data unit, so that the data stream which is further transmitted by the second data processing unit PU2 does not incur an other delay than the predetermined forwarding delay. In other words if a isochronous data unit is not received correctly before it needs to be forwarded to a next data unit, the schedule progresses, so that at least the data that follows the erroneously received data unit will be forwarded on time.

In the following the isochronous retry buffer is understood to be the isochronous retry buffer RBUF in the retry handler RH of the first processor unit PU1. The isochronous input buffer IBUF is understood to be the isochronous input buffer IBUF of the slot handler SH of the second processor unit PU2.

FIG. 13 shows the content of the buffers during a normal operation wherein no errors occur. In this Figure the vertical direction is indicative for the time, the flow of time being from top to bottom. From left to right the following is shown: the isochronous schedule for switch X1, the content of the isochronous retry buffer RBUF in the retry handler RH of the first processor unit PU1, the data transmitted via the link, the content of the isochronous input buffer IBUF of the second processor unit, and the isochronous schedule for switch X2.

As can be seen in FIG. 13, switch X1 has a schedule for data traffic from 4 connections, A, B, C and D. The schedule is repetitive with a period of 16 time slots In the schedule the blank slots are unassigned. These are available for best effort data.

It can be seen that the schedule for receiving switch X2 is delayed by 5 time-slots with respect to that of switch X1.

At time slot 1 a data unit Ab for connection A is scheduled for transmission by switch X1. According to the schedule it is transmitted via the link T1$x$-R2$x$ and stored in the isochronous retry buffer RBUF of the retry handler RH of the first data processor unit PU1. In addition a data unit Aa is stored in the isochronous retry buffer RBUF during a previous time slot. The transmitted data unit Ab is stored in the isochronous input buffer IBUF in the slot handler SH of the second data processor unit. This input buffer IBUF already contains earlier received data units Aa of connection A and Dc of connection D, while an earlier received data unit Db is scheduled for transmission to a next switch.

At time slot 2 data unit Ac is transmitted via the link according to schedule. In addition it is temporarily stored in the retry buffer RBUF. In said time slot the data unit Ac is stored in the input buffer IBUF of the second data processor unit PU2, while a previous data unit Dc is scheduled for further transmission.

In the third time slot the first processor unit PU1 transmits a data unit Ad. It is stored in the retry buffer RBUF according to schedule. In the same time slot, data unit Aa is removed from the retry buffer RBUF, 3 time slots after it was written in the retry buffer RBUF. The transmitted unit Ad is received by the second processor unit PU2, and stored in the isochronous input buffer IBUF thereof. No data transmission is scheduled in the third time slot for the second processor unit PU2. Hence, the second processor unit PU2 may use this time slot for transmission of best effort data.

FIG. 14 shows a second situation, wherein a single error occurs in an isochronous slot.

Until time slot 6 operation proceeds identical as described with reference to FIG. 13.

In time slot 6 processor unit 1 transmits a data unit Ba according to schedule and stores a copy of this data unit in its retry buffer RBUF. The second processor unit PU2 stores a copy of this data unit in its input buffer IBUF, and removes data unit Ab there from.

At the end of time slot 6 the second processor unit PU2 detects an error in data unit Ba, and in time-slot 7 it submits a message indicating this to the first processor unit PU1. This schematically indicated in FIG. 15. This Figure schematically shows the data processor units PU1, PU2, as well as in more detail the data stream transmitted via the return link from PU2 to PU1. In time slots t=3, . . . , t=6 the second data processor unit transmits respective data units, e.g. isochronous or best effort via the return link. After completion of the transmission of the data unit for time slot t=6 it inserts a control sequence indicative for the error. In the embodiment shown the control sequence subsequently comprises a 4-bit control code, an 8-bit indication for the slot number of the erroneously received data unit and a 4-bit CRC code. Slot numbers are counted starting from the last received reference slot. A slot counter (not shown) provides the slot number and is adjusted in case of a resynchronization.

In the embodiment shown the control code includes a 2-bit control indicator to discriminate a.o. between a "normal" and a "panic" message and a 2-bit type indicator to indicate various normal, or various panic messages. After this control message the second data processor unit continues with the transmission of the data units for time slots t=7, . . . , t=9. The slight delay caused by the insertion of the control data is within the tolerance of the link.

With reference to FIG. 14 again, in time-slot 7 the first data processor unit PU1 transmits the subsequent data unit Bb, stores this in its retry buffer RBUF and discards data unit Ae from the previous series from its retry buffer RBUF.

In time slot 8 data processor unit PU1 transmits data unit Ca from connection C, still according to schedule, and stores it in its retry buffer RBUF. Data unit Af from connection A is discarded from the retry buffer RBUF.

In time slot 9 the first data processor unit PU1 has processed the error message from the second data processor unit PU2. Instead of using this time slot for best effort data it retransmits data unit Ba from its retry buffer RBUF to the second data processor unit PU2, which stores this data unit in its input buffer IBUF. It is noted that the error in the received data unit may be the result from an incorrect clock recovery. I.e. the two processor units PU1, PU2 may be out of synchronization. This implies that also the data units transmitted after the data unit for which the error was recovered are unreliable. To prevent a further propagation therefore, the forward link between the first and the second data processor unit PU1, PU2 is resynchronized before retransmission (indicated by R in the drawing. In addition, not only the selected data unit for which an error was detected is retransmitted, but also the isochronous data units that were already transmitted in the period between the first transmission of the selected data unit and the retransmission.

The nature of the resynchronization depends on the way in which the clock signal is transmitted. In cases where the clock signal is transmitted via a separate line the resynchronization is initiated by a powering down of the link, followed by a restart.

At restart the first data processing unit PU1 transmits a resynchronization control sequence that contains the reference slot number of the data unit that immediately follows the control sequence. This process is schematically shown in FIG. 16. As shown therein, in time slot 6 the first processor unit PU1 transmits data unit Ba, which is received erroneously by the second data processor unit PU2. In the subsequent time slots 7, 8, the first data processor unit PU1 respectively transmits the data units Bb and Ca. Then before the start of the timeslot 9 the link is powered down and restarted, which requires a power down and restart time Tpdr. The processor unit PU2 transmits the resynchronization control sequence CTRLM comprising control indicator CTRLI, control type CTRLT, the slot number wherein the erroneously received data unit was transmitted SNUM=6, and an error detection code, here a cyclic redundancy check RCC. Then the data unit Ba is retransmitted In case of an embedded clock a power down is not necessary. In that case it suffices to transmit predetermined training sequences, such as the K-code sequences used in PCI-Express.

Referring to FIG. 14 again, in time slot 9 the second data processor unit has scheduled data unit Ac for further transmission.

In time slot 10 the first data processor unit PU1 retransmits data unit Bb, and second data processor unit PU2, stores this data unit in its input buffer IBUF. The second data processor unit PU2 has scheduled data unit Af for further transmission.

In time slot 11 the second data processor unit PU2 has scheduled data unit Ba for further transmission. Despite the fact that an error occurred in the transmission of this data unit Ba from the first to the second data processor unit PU1, PU2, this data unit is available for further transmission according to the transmission schedule of the second data processor unit PU2.

Figure 17:
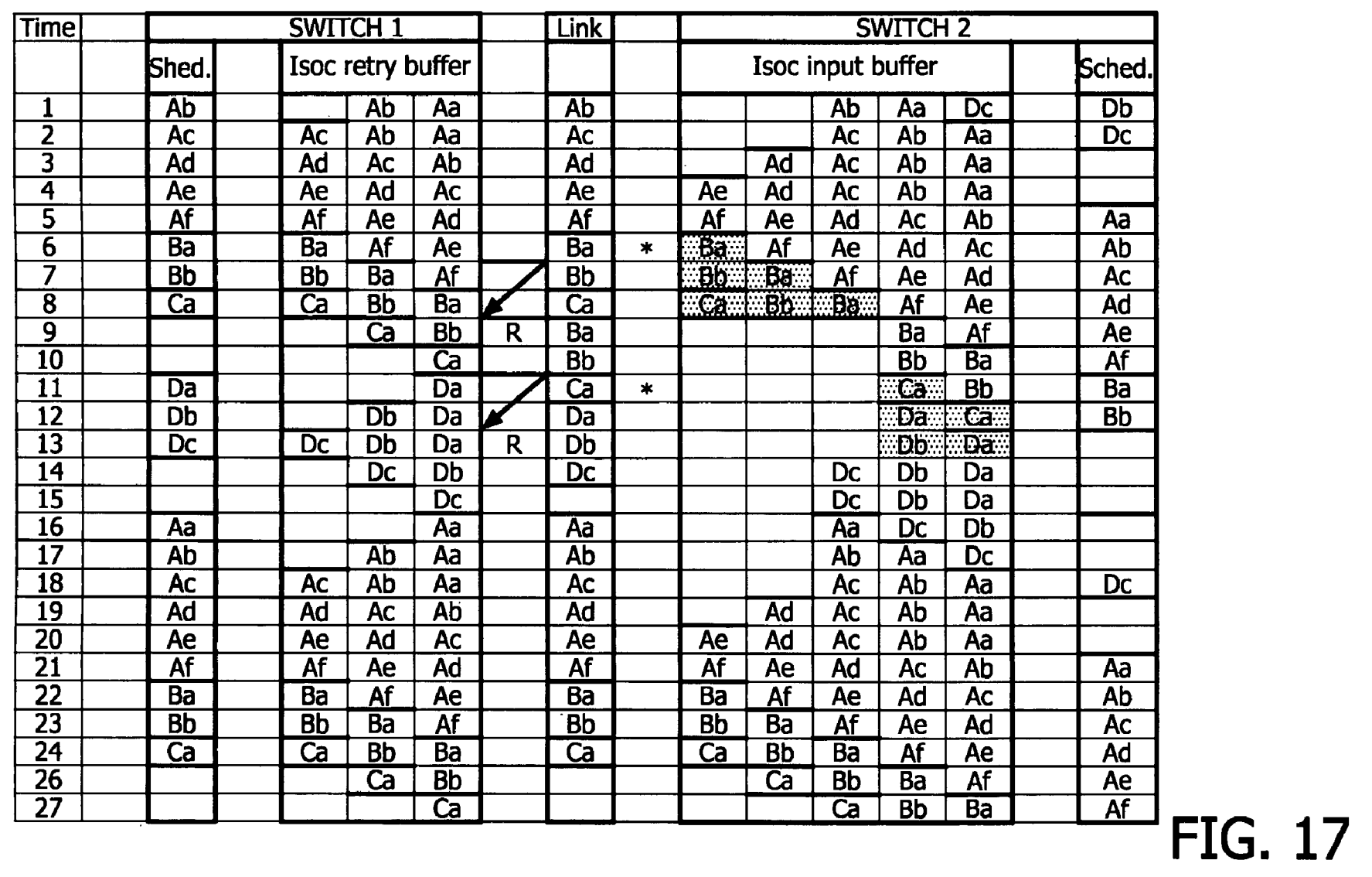

FIG. 17 shows a third situation where an error occurs during retry. Until time slot 11 the data transmission process proceeds identical to that in the previous situation. At the end of timeslot 11 the second data processor unit PU2 has recognized an error in the transmission of data unit Ca and reports the error to the first data processor unit PU1. At the end of timeslot 13 the first data processor unit PU1 has processed this error message. As this requested data unit Ca is no longer present in the retry buffer the first data processor unit PU1 does not further transmit the unreliable data units Ca, Da, and Db. However it does initiate a resynchronization (R) of the link between the first and the second data processor unit PU1, PU2, between time slots 13 and 14. Then it continues with the transmission of data unit Dc in timeslot 14, according to schedule.

As the first data processor unit PU1 limits retransmission of a data unit to a predetermined maximum number of times irrespective of whether the data unit is correctly received or not, the error only temporarily influences the time schedule for transmission of the second data processor unit PU2.

In the example shown, the error during retry occurred in the data unit Ca. If the first error only affected the data unit Ba, and not the clock signal, and the isochronous data unit Ca was properly received at its first transmission then the version of this data unit Ca stored in the input buffer of the second processor unit PU2 can be used for further transmission instead.

The slot handler SH of the second data processor unit PU2 has the following options.

If for whatever reason an isochronous data unit has been labeled as erroneous after second transmission, it is preferably not transmitted further. Instead the slot already reserved for it may be used for transmission of a best effort data unit. Alternatively powering the link down during that time slot may save power. However, in an embodiment the slot handler may still send the corrupted data unit and let the application in the destination decide how to handle it.

FIG. 18 shows a further special case. Like the situation in FIGS. 17 and 14 an error is detected in the data unit Ba received in time slot 6 by the second data processor unit PU2. Likewise, upon detection of this error the second processor unit PU2 transmits a control message to the first data processor unit PU1 indicating the error. However, in this case the first data processor unit PU1 does not correctly receive the control message. As a result the first data processor unit PU1 continues transmission according to schedule. In time slot 9 the second data processor unit PU2 recognizes that the first data processor unit PU1 has not retransmitted the erroneously received Ba within the expected time interval, i.e. a time-out occurred. Upon detecting this time-out the second data processor unit PU2 resynchronizes the return link to PU1 and sends a message, e.g. a repetition of the earlier error message to PU1. As the erroneously received data unit Ba is no longer present in the retry buffer of PU1 it cannot be retransmitted. However, the first data processor unit PU1 resynchronizes the forward link to PU2 before continuing with the transmission of Ca in time slot 11, so as to reduce the possibility for further errors.

It is remarked that the scope of protection of the invention is not restricted to the embodiments described herein. Parts of the system may be implemented in hardware, software or a combination thereof. For example the various control blocks, e.g. CTRL, RCTRL may be implemented by a suitably programmed general-purpose micro-controller, but may alternatively be implemented as dedicated hardware. The input and retry buffers may be implemented in various ways. Small fifos can be implemented using hardware fifos or shift registers, which have separate write and read interfaces, thus requiring separate state machines. Large FIFOs may be implemented by RAM, either dual port (one port for writing, one for reading), or single port. In the latter case statically scheduled cycles are preferred for writing and reading. In both cases, separate state machines lead to a simpler design.

Neither is the scope of protection of the invention restricted by the reference numerals in the claims. The word 'comprising' does not exclude other parts than those mentioned in a claim. The word 'a(n)' preceding an element does not exclude a plurality of those elements. The invention resides in each new feature or combination of features.

The invention claimed is:

1. A data processor system comprising:
   a first and a second data processor unit, the first data processor unit comprising:
      a data source configured to provide data for transmission to the second data processor unit, the data comprising first data units and second data units,
      a retry buffer configured to temporarily store the transmitted first data units,
      a data selector configured to select the first data units from the data source or from the retry buffer,
      a controller configured to control the data selector, and
      a first output configured to provide the data selected for transmission,
   the second data processor unit comprising:
      an input configured to receive the transmitted data,
      a second output configured to further transmit the received data to a third data processor unit,
      an input buffer coupled to the input, the input buffer configured to temporarily store the received first data units,
      an error detector configured to detect an error in the received first data units,
      a message generating unit coupled to the error detector, the message generating unit configured to generate an error message for the first data processor unit in case the error detector detects an error,
      wherein the controller of the first data processor unit is configured to cause the data selector to select the first data units from the retry buffer if it receives an error message, and cause the data selector to select the first data units from the data source otherwise, wherein the first data processor unit is configured to limit retransmission of the first data units belonging to a guaranteed throughput traffic class to a predetermined maximum number of times irrespective of whether the first data units are correctly received by the second data processor unit or not, and wherein the data processor system is configured to only provide for a retransmission of the first data units, the second data units configured to be transmitted on a best effort basis and during time intervals wherein no transmission or retransmission of the first data units are scheduled.

2. The data processor system according to claim 1, wherein the second data processor unit is configured to transmit the first data units at a period of time later than when the first data processor unit transmits the first data units for the first time, the period of time being at least equal to the period of time after which the first data units could be further transmitted if the first transmission were followed by the predetermined maximum number of retransmissions, wherein the second data processor unit includes a buffer capacity sufficient to accommodate the first data units from the moment it receives the first data units until it transmits the first data units.

3. The data processor system according to claim 1, wherein the data source of the first data processor unit comprises at least one of a switch and a router, the switch or router coupled to a plurality of input ports, and wherein the first data processor unit further comprises a scheduler configured to select the first data units from one of the input ports according to a schedule.

4. The data processor system according to claim 1, wherein the switch or router of the first data processor unit further comprises a plurality of output ports.

5. The data processor system according to claim 1, wherein the first processor unit is configured to provide a tag indicative of the time slot in which the first data units were originally transmitted during a retransmission of the first data units.

6. The data processor system according to claim 1, further comprising a forward link configured to transmit the first data units from the first to the second data processor unit, the forward link being resynchronized before retransmission.

7. The data processor system according to claim 1, wherein the data units comprise isochronous data units, the controller configured to retransmit those isochronous data units which were already transmitted in the period between the first transmission of the first data units for which an error was detected and their retransmission.

8. The data processor system according to claim 1, wherein the second data processor unit comprises a time-out module which is configured to provide a time-out signal if the first data units for which an error was reported is not retransmitted in time by the first data processor unit and wherein the second data processor unit is configured to initiate a resynchronization of a backward link used for reporting the error.

9. A method for communicating data comprising the steps of:
transmitting data units comprising first data units and second data units, the first data units including an error detection code;
storing the first data units in a retry buffer;
receiving the first data units;
storing the first data units in an input buffer;
verifying the correctness of the received first data units using the error detection code;
requesting a retransmission of the first data units in case the received first data units were not verified as correct;
retrieving the first data units from the retry buffer and retransmitting the first data units upon the request;
receiving the retransmitted first data units;
transmitting the received first data units to a further data processor unit, wherein retransmission of first data units belonging to a guaranteed throughput traffic class is limited to a predetermined maximum number of times irrespective of whether the data units are correctly received or not, the second data configured to be transmitted on a best effort basis and during time intervals wherein no transmission or retransmission of the first data units are scheduled.

10. The method for communicating data according to claim 9, further comprising transmitting control data at the boundary of a first and a second time slot, the second time slot commencing as soon as the transmission of the control data is completed.

11. The method for communicating data according to claim 9, further comprising transmitting control data at the boundary of a first and a second data packet, the transmission of the second data packet commencing as soon as the transmission of the control data is completed.

12. The method for communicating data according to claim 9, further comprising transmitting control data at the boundary of a first and a second byte of user data, the transmission of the second byte of user data commencing as soon as the transmission of the control data is completed.

13. A data processor system comprising:
a first and a second data processor unit, the first data processor unit comprising:
a data source means configured to provide data for transmission to the second data processor unit, the data comprising first data units and second data units,
a retry buffer means configured to temporarily store the transmitted first data units,
a data selector means configured to select the first data units from the data source means or from the retry buffer means,
a controller means configured to control the data selector means, and
a first output means configured to provide data selected for transmission;
the second data processor unit comprising:
an input means configured to receive the transmitted data,
a second output means configured to further transmit the received data to a third data processor unit,
an input buffer means coupled to the input means, the input buffer means configured to temporarily store the received first data units,
an error detector means configured to detect an error in the received first data units, and
a message generating unit means coupled to the error detector means, the message generating unit means configured to generate an error message for the first data processor unit in case the error detector means detects an error,
wherein the controller means of the first data processor unit is configured to cause the data selector means to select the first data units from the retry buffer means if it receives an error message, and cause the data selector means to select the first data units from the data source means otherwise, wherein the first data processor unit is configured to limit retransmission of the first data units belonging to a guaranteed throughput traffic class to a predetermined maximum number of times irrespective of whether the first data units are correctly received by the second data processor unit or not, wherein the data processor system is configured to only provide for a retransmission of the first data units, and wherein the second data units configured to be transmitted on a best effort basis and during time intervals wherein no transmission or retransmission of the first data units are scheduled.

14. The data processor system according to claim 13, wherein the second data processor unit is configured to transmit the first data units at a period of time later than when the first data processor unit transmits the first data units for the first time, the period of time being at least equal to the period of time after which the first data units could be further transmitted if the first transmission were followed by the predetermined maximum number of retransmissions, wherein the second data processor unit includes a buffer capacity sufficient to accommodate the first data units from the moment it receives the first data units until it transmits the first data units.

15. The data processor system according to claim 13, wherein the data source means of the first data processor unit comprises at least one of a switch means and a router means, the switch means or router means coupled to a plurality of input port means, and wherein the first data processor unit further comprises a scheduler means configured to select the first data units from one of the input port means according to a schedule.

16. The data processor system according to claim 15, wherein the switch means or router means of the first data processor unit further comprises a plurality of output port means.

17. The data processor system according to claim 13, wherein the first processor unit is configured to provide a tag indicative of the time slot in which the first data units were originally transmitted during a retransmission of the first data units.

18. The data processor system according to claim 13, further comprising a forward link means configured to transmit the first data units from the first to the second data processor unit, the forward link being resynchronized before retransmission.

19. The data processor system according to claim 13, wherein the data units comprise isochronous data units, the controller means configured to retransmit those isochronous data units which were already transmitted in the period between the first transmission of the first data units for which an error was detected and its retransmission.

20. The data processor system according to claim 13, wherein the second data processor unit comprises a time-out module means which is configured to provide a time-out signal if the first data units for which an error was reported is not retransmitted in time by the first data processor unit and wherein the second data processor unit is configured to initiate a resynchronization of a backward link means used for reporting the error.

* * * * *